T. J. SPARKS.
AUTOMOBILE WHEEL.
APPLICATION FILED MAY 13, 1907. RENEWED APR. 12, 1909.
954,144.
Patented Apr. 5, 1910.
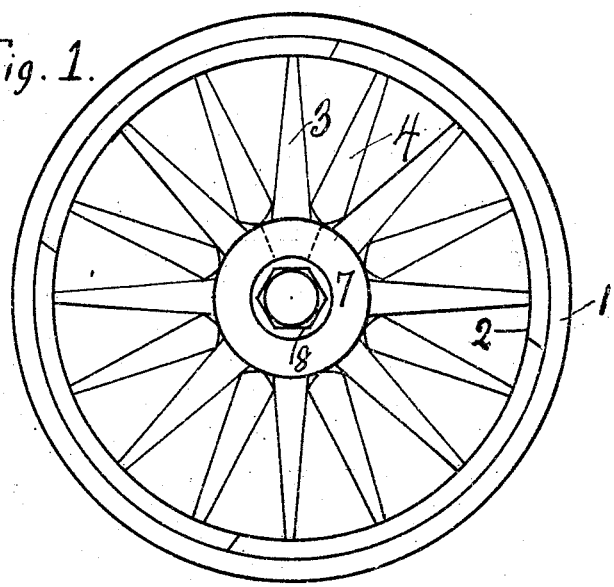
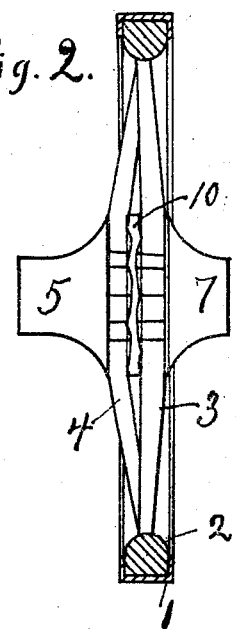
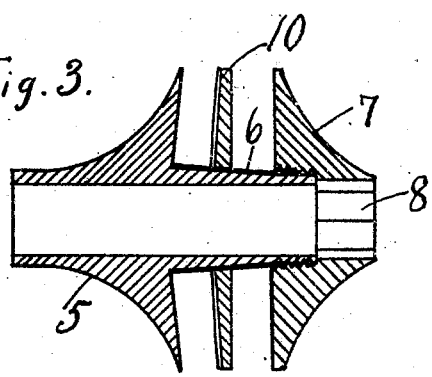
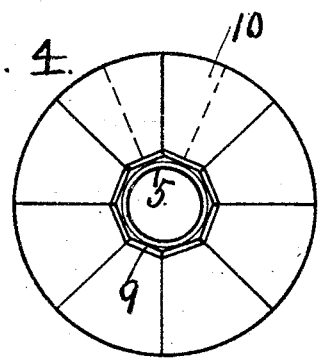
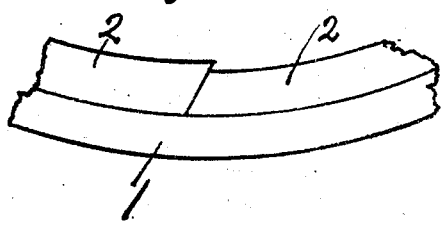
WITNESSES:
E. J. Fraser
C. R. Olney.
INVENTOR
T. J. Sparks.
BY Carlos P. Griffin
ATTORNEY

UNITED STATES PATENT OFFICE.

THOMAS J. SPARKS, OF SAN FRANCISCO, CALIFORNIA, ASSIGNOR, BY DIRECT AND MESNE ASSIGNMENTS, OF ONE-HALF TO UNCLE SAM AUTOMOBILE CO., OF PHOENIX, ARIZONA TERRITORY, A CORPORATION OF ARIZONA TERRITORY, AND ONE-HALF TO EDWARD C. RAY, OF SAN FRANCISCO, CALIFORNIA.

AUTOMOBILE-WHEEL.

954,144.      Specification of Letters Patent.      Patented Apr. 5, 1910.

Application filed May 13, 1907, Serial No. 373,246. Renewed April 12, 1909. Serial No. 489,524.

*To all whom it may concern:*

Be it known that I, THOMAS J. SPARKS, a citizen of the United States, and a resident of the city and county of San Francisco, State of California, have made certain new and useful Improvements in Automobile-Wheels, of which the following is a specification in such full and clear terms as will enable those skilled in the art to construct and use the same.

This invention relates to wheels which are used on wagons or other means of land conveyance where wheels having wooden spokes are desired to be used.

An object of this invention is to make such a wheel as will stand the heavy strains put on such wheel without breaking down, the position of the spokes being such as to give the wheel the greatest strength to resist the side thrusts due to running into holes in the road.

Another object of this invention is to make such a wheel as will do the required work, and be at all times provided with means to take up any wear or looseness of the spokes at the hub, and yet not have a single bolt or rivet to hold its several parts together.

Another object of the invention is to secure the desired results with the fewest possible parts, and to make these parts in such a way as to enable them to be used after the spokes may have been completely worn out, a new set of spokes being applied to the old hub as easily as the setting of a tire on the common style of riveted hub.

A further object of the invention is to provide the hub with means to keep it tight at all times, the turning moment of the axle being applied to drive the wheel in such a way as to tend to keep the parts of the hub close together at all times. To carry this out the common right hand thread is used on one side and the left hand thread on the opposite hub.

A further object of the invention is to provide a wheel such as may be tightened without the usual shortening of the tire, the hub being of such shape as to drive the spokes out as the members are tightened.

A further object of the invention is to provide means to tighten the felly on the wheel without the use of bolts in the same through the tire, and a still further object of the invention is to provide means to insure the proper rotation of the spokes with the hub at all times.

Other objects of the invention will appear as the description proceeds.

In the drawings, in which like numerals of reference refer to like parts throughout, Figure 1 is a side elevation of the wheel, looking from the outside, Fig. 2 is a sectional view showing the hub in full, but with only the top and bottom spokes showing, Fig. 3 is a vertical sectional view of the hub, Fig. 4 is a front view of the hub with the point of the hub omitted, and Fig. 5 is a detail of the way the felly is tightened in the tire.

The wheel is provided with a channel iron tire 1 and wood felly 2, held in its place in the tire by means of spokes 3 and 4. The set of spokes 3 are nearly vertical with respect to the axis of the hub, while the set 4 are placed the width of the spokes plus the thickness of the ring 10 away from the other set. The object of this is to give the wheel the necessary strength to resist side thrusts. The hub is made up of three pieces, the heel 5 having a projecting member 6, the point 7, which is screwed on the member 6, and a ring 10.

It will be observed that the member 6 is provided with a polygonal exterior, as shown at 9, the number of faces of the polygon being one half the number of spokes in the particular wheel. In this way one set of spokes is set down on the full face for each spoke, while the other set of spokes is set down on two faces, as indicated in dotted lines in Fig. 4, the ring 10 having a series of low corrugations in which each spoke fits. These low depressions, or corrugations, are shown in Fig. 2 and are alternately placed, as is also indicated by the dotted lines in Fig. 4. The purpose of these waves is to give the hub greater holding power on the spokes, the ring being shaped to fit the polygonal member 6 closely.

Another feature that will be noted is that the point 7 of the hub is polygonal as indicated at 8. The purpose of this is to provide means for the axle of the machine to drive the wheel, and at the same time to turn the point 7 in such a direction as will tend to keep it tight up on the spokes at all times, since the resistance to turning of the wheel is transmitted to the axle by means of the spokes and the main part of the hub 5.

Another feature that will be noted is that the felly is cut slanting, as shown in Figs. 1 and 5, so that it is possible to push it down level with the adjacent member of the felly only by means of heavy pressure, this pressure being supplied by the tightening of the hub member 5 and the point 7.

To assemble the wheel the tires are made of the proper size and laid on a table, the felly members are then placed in the tire care being taken to see that the total number required have a greater length than the exact length of the inside of the tire. This will leave each joint a little above each adjacent member, and thus provide the necessary material to make the wheel tight. When the various members of the fellies have been placed in position the spokes are placed in their places, the hub member 5 having been placed on the table with its projecting part 6 up. The spokes are of such a length as to make the fellies moderately tight when at a distance from the wing of the hub 5. When the spokes 4 have been placed in their position the ring 10 is placed down on them and the spokes 3 are then put in their position. The point of the hub 7 is then placed on the member 6 and is screwed down as tight as possible. The tightening of the point of the hub on the hub member 5 draws the two members together and forces the spokes up the incline of the wedge member 6 and in this way the spokes are forced out and the felly is tightened as tight as it is possible to make it, the spokes being close enough together to force the short end of the felly members down on each other and bring them into substantially the same plane on their interior surface.

It will also be noted that if a wheel lighter than the one indicate above is desired all that is necessary is to take off the ring 10 and put on the spokes all in one line, a lighter spoke being used. The action of the member 6 will in the same way tighten the spokes and the only difference will be that the spokes are not set out of line as shown in the drawings.

It will be obvious that the wheel is capable of use in any situation where strength and rigidity is desired, and it will also be obvious that new spokes may be refitted with very much less trouble than where it is necessary to "set" the tire on the completed wheel.

Modifications of the invention, within the scope of the appended claim, are expressly reserved.

What I claim as new and desire to secure by Letters Patent of the United States is as follows:

In a wheel, the combination of a tire, a felly, spokes, a hub consisting of a flanged tubular member having threads on one end and being pyramidal from the threaded portion to the flange said flange having its surface toward the threaded end conical, a flat ring having a series of depressions on each side of the same set at a phase difference of one half, and a flange having a part of its interior threaded and adapted to screw on the end of the tubular member and the remainder of its interior polygonal.

In testimony whereof I have hereunto set my hand in the presence of the two subscribing witnesses this 6 day of May A. D. 1907.

THOMAS J. SPARKS.

Witnesses:
J. H. WARE,
C. P. GRIFFIN.